(12) United States Patent
Caretta et al.

(10) Patent No.: US 6,408,913 B1
(45) Date of Patent: Jun. 25, 2002

(54) DEVICE FOR INFLATING AND DEFLATING A TIRE INNER TUBE, INNER TUBE AND WHEEL FORMED BY A TIRE AND A RIM INSIDE WHICH THE INNER TUBE IS ARRANGED

(75) Inventors: Renato Caretta, Gallarate; Alessandro Volpi, Milan; Marco Cantu', Carnate, all of (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/252,061

(22) Filed: Feb. 18, 1999

Related U.S. Application Data
(60) Provisional application No. 60/086,888, filed on May 27, 1998.

(30) Foreign Application Priority Data

Feb. 19, 1998 (EP) .............................. 98830079

(51) Int. Cl.[7] .......................... F16K 15/20; B60C 29/00
(52) U.S. Cl. ...................... 152/415; 152/427; 137/227; 137/493.8
(58) Field of Search ................................ 152/415, 427, 152/429; 137/224, 493, 493.6, 493.8, 226, 227; 251/129.01, 129.15, 331, 336

(56) References Cited

U.S. PATENT DOCUMENTS

| | | | |
|---|---|---|---|
| 2,301,096 A | | 11/1942 | Truscott |
| 2,905,221 A | | 9/1959 | Nonnamaker |
| 3,038,516 A | | 6/1962 | McConkie |
| 3,038,517 A | | 6/1962 | McConkie |
| 3,616,831 A | | 11/1971 | Lafuente et al. |
| 4,015,624 A | * | 4/1977 | Wanstreet et al. ........... 137/224 |
| 4,034,790 A | | 7/1977 | Johannsen et al. |
| 4,216,809 A | | 8/1980 | Pixley |
| 4,280,546 A | | 7/1981 | Mistretta |
| 4,582,084 A | * | 4/1986 | Gyurovits ................. 137/493.8 |
| 5,054,511 A | * | 10/1991 | Tuan et al. .................. 137/224 |
| 5,109,905 A | | 5/1992 | Lambe |
| 5,181,977 A | * | 1/1993 | Gneiding et al. ........... 152/429 |
| 5,544,688 A | * | 8/1996 | Freigang et al. ............ 152/415 |
| 5,560,792 A | * | 10/1996 | Anthony ..................... 152/415 |
| 5,634,993 A | | 6/1997 | Drieux et al. |

FOREIGN PATENT DOCUMENTS

| | | |
|---|---|---|
| DE | 2 301 878 | 7/1974 |
| EP | 0 170 085 | 2/1986 |
| EP | 0 263 251 | 4/1988 |
| EP | 0 590 481 A1 | 4/1994 |
| FR | 2 348 066 | 11/1977 |
| FR | 2 608 514 | 6/1988 |
| WO | WO94/13498 | 6/1994 |

OTHER PUBLICATIONS

U.S. patent application Serial No.: 09/317,407, filed on May 24, 1999.

* cited by examiner

Primary Examiner—Russell D. Stormer
(74) Attorney, Agent, or Firm—Finnegan, Henderson, Farabow, Garrett & Dunner, LLP

(57) ABSTRACT

A device for inflating and deflating a flexible container which is elastically expandable for introduction of pressurized fluid into an internal volume of the container is described. The device is housed inside a cavity isolable from a surrounding environment, the device being inserted in a wall of the container. Pressurized fluid can flow from the surrounding environment into the cavity and from the cavity out to the surrounding environment. The device does not have elements for connecting the internal volume of the container and the surrounding environment.

19 Claims, 3 Drawing Sheets

DEVICE FOR INFLATING AND DEFLATING A TIRE INNER TUBE, INNER TUBE AND WHEEL FORMED BY A TIRE AND A RIM INSIDE WHICH THE INNER TUBE IS ARRANGED

This application claims benefit of application Ser. No. 60/086,888, filed May 27, 1998.

The present invention relates to a valve for inflating inner tubes for tyres (alternatively spelled "tires"), to an inner tube provided with said valve and to a wheel for vehicles comprising a tyre mounted on a corresponding rim and provided with said inner tube; more particularly, the invention relates to an inner tube formed by one or more separate compartments and provided with an inflation valve which does not have any fixed systems for connection to the outside of the tyre (alternatively spelled "tire") and the rim.

The wheel is the element forming a link between vehicle and road; it performs the functions of providing the vehicle and its load with a pneumatic-type support system and ensuring, by means of the tyre, a suitable behaviour on the road.

Supporting of the vehicle is provided by the volume of pressurized air contained inside the wheel; for this purpose, the first and the most common of the solutions adopted consists in the use of an inner tube inserted between tyre and rim and inflated with pressurized air introduced into the tube by means of an inflation valve projecting outside the wheel.

More precisely, the wheel comprises a tyre defining a toroidal cavity which is mounted on a corresponding rim and has a bottom surface provided with a central channel and two bead seats on which the beads of the tyre rest in abutment and which are each axially delimited between an end radial surface (projecting shoulder) in an axially external position and an axially internal, annular, raised countersurface.

The inner tube, inserted between tyre and rim, comprises a torus-shaped expandable tubular body which is generally made of elastomeric material and which can be inflated by means of an associated inflation valve. The valve usually comprises a base for connection to the inner tube and a cylindrical casing (stem) which is fixed to the base and inside which the mechanism for activating the inflating and deflating operations is arranged.

The stem of the valve is usually housed in a suitable hole which is provided on the bottom surface of the rim, more precisely on the channel wall, and from which it emerges into the external environment, at atmospheric pressure, with the corresponding end closed by a cap.

The aforementioned valve allows at least three fundamental operations to be carried out in order to provide the tyre with the correct operating pressure, i.e. inflation and rapid deflation and adjustment to the desired pressure value.

The traditional inner tubes, precisely on account of the fact that they comprise a stem passing through the rim, may pose problems—which are currently still unsolved—in some operating conditions of the tyre.

In fact, in conditions of rapid acceleration of the vehicle, it has been noted that the tyre may slip with respect to the rim with a consequent high risk of tearing of the tube at the bottom of the valve or shearing of the valve stem, which results in immediate deflation of the tyre and corresponding loss of stability of the vehicle, with serious risks as regards the safety of the driver and the passengers of the vehicle itself.

The problem is further accentuated in the case of high-performance tyres, but cannot be excluded in other applications, in particular in view of the fact that the present-day vehicles, even though they have a limited power, and hence are incapable of very high speeds, nevertheless allow high driving torques to be transmitted to the ground, so as to give rise to the aforementioned risks.

Essentially the problem of having an inner tube which is safe even in the case of slipping between the tyre and rim is still unsolved.

Moreover, it must be pointed out that the mounting of a traditional inner tube between tyre and rim involves a few problems since the inner tube must be inserted by passing it through the limited space defined between the side of the tyre and rim and then, by means of successive attempts at performing a manual operation which is not particularly easy, introducing the stem of the valve through the appropriate hole on the rim so that it emerges with its end portion into the environment outside the wheel, at atmospheric pressure. In particular, the aforementioned problem arises more frequently in so-called "low profile" tyres, where the ratio between the cross-sectional height, measured between the base of the beads and the top of the tread, and the maximum width of the tyre, is equal to or less than 0.7.

The Applicant has realized that there is the possibility of solving the problems according to the state of the art by adopting a flexible container, which may be an inner tube, having the characteristic feature that the valve or the valves necessary for inflating or deflating it do not have any element for connection to the external environment, passing through the rim.

In particular, the Applicant has realized that inflation of the tube could be performed by introducing pressurized air into the space between tyre and rim, so as to deform the tube with respect to its initial shape and thus create a difference in pressure between the internal volume of the tube and the external space and then waiting for the equilibrium between the pressures in the aforementioned environments to be re-established, corresponding to a return of the tube to its original undeformed configuration. Subsequently the air present outside the tube could be left to flow out into the surrounding environment, thus allowing expansion of the tube itself until it completely fills the cavity between tyre and rim.

Advantageously, the initial introduction of pressurized air into the aforementioned space would exert also a thrusting force useful for positioning the beads of the tyre in abutment on the corresponding seats of the rim, against the projecting shoulders, so as to form a preliminary sealed closure of the abovementioned space. According to the Applicant's idea, the correct and predetermined value of air pressure inside the tube would be reached by allowing the air which has an overpressure with respect to the desired value to flow out by means of a device which has been suitably adjusted to said value.

According to a first aspect thereof, the invention relates to a device for inflating and deflating a flexible container which is elastically expandable for the introduction of pressurized fluid into its internal volume and which can be housed in a cavity which can be isolated from an external environment, at atmospheric pressure, said device being inserted in a wall of said container, characterized in that it does not have elements for connecting the internal volume of said container and said external environment.

More particularly, the container is an inner tube for tyres and the cavity which can be isolated from the external environment includes the toroidal space defined by a tyre mounted on the corresponding mounting rim.

In a first embodiment thereof, the device according to the invention comprises three separate valves for separately performing the three operations fundamental for operation of the -tube, i.e. at least one first inlet valve for inflating the tube with pressurized fluid, at least one second adjustment valve for regulating and maintaining the pressure existing inside the tube within a predetermined range of values, and at least one third discharge valve for rapid deflation of the tube.

In a second embodiment of the device a single valve performs the two functions of adjustment and rapid deflation of the tube, the inflating function being assigned to a second valve.

In another preferred embodiment of the invention a single device performs all three required functions, i.e. it combines an inflation valve with a second valve for adjustment and rapid deflation of the tube.

In all the cited embodiments the function of rapid deflation of the tube may be advantageously performed by acting, from the outside, on the mechanism activating the valve so as to cause opening thereof, for example by means of remote interaction based on the creation of electric or electromagnetic fields or by means of remote commands with specific operating frequencies or with direct mechanical actions on said activation mechanism performed using instruments passing through the rim after having opened in the wall thereof special openings provided specifically for this purpose.

Depending on the selected type of inflation valve, closing of said valve may be effected by means of an overpressure of the inflating fluid or by means of a mechanical effect as a result of interference between the valve body and an opposition surface.

It is pointed out here that the term "pressure", unless otherwise specified, is always understood as being an overpressure with respect to atmospheric pressure. In a preferred embodiment thereof, the device comprises a single rigid body incorporating an inflation valve, an adjustment valve and a deflation valve; even more preferably the three aforementioned valves are incorporated in a single actuating mechanism.

According to a second aspect thereof, the invention relates to an inner tube for vehicle wheel tyres which is elastically expandable by introduction of pressurized fluid into its internal volume and is provided with a device for the introduction and extraction of said fluid respectively into and from said volume, said device being inserted in a wall of the inner tube. The inner tube can be housed in the cavity which is defined by the tyre mounted on its operating rim, isolated from the external environment at atmospheric pressure. The inner tube is characterized in that its inflation device does not have elements for connecting the internal volume of the tube and said external environment.

In a preferred embodiment the inner tube is moulded and vulcanized in a toroidal shape so that the elastic reaction determined by a deformation imparted to said tube tends to cause it to return into its original shape.

According to a third aspect thereof, the invention relates to a tyre wheel for vehicles, comprising a tyre mounted on the corresponding mounting rim, said tyre mounted on said rim defining a toroidal cavity which can be isolated from the external environment at atmospheric pressure, and an inner tube inserted inside said cavity and provided with an inflation device, characterized in that said device does not have any system for connection to said rim, designed to fix the circumferential position of said tube with respect to the rim.

According to a fourth aspect thereof, the invention relates to a tyre comprising a pair of axially facing sidewalls which terminate in a pair of beads for assembly of the tyre on a corresponding mounting rim and which define a first toroidal cavity closed by an elastically deformable circumferential baffle which is fixed to the said sidewalls and in which a device for inflation and deflation of the tyre is inserted. When the tyre is mounted on the rim, a second toroidal cavity is defined between the baffle and the rim and both the aforementioned toroidal cavities can be isolated from the external environment at atmospheric pressure.

The tyre according to the invention is characterized in that said inflation and deflation device does not have elements for connecting the inside of the first cavity and the aforementioned external environment at atmospheric pressure.

In a particular embodiment of the invention, this baffle is formed by a circumferential portion of the casing of an inner tube which is elastically expandable and the remaining part of which casing adherent to the internal surface of the tyre, preferably by means of vulcanization.

The aforementioned inflation and deflation device, which does not have elements for connecting the inside of the inner tube and the environment outside the wheel at atmospheric pressure, is inserted in the free wall portion of the inner tube.

According to a fifth aspect thereof, the invention relates to a method for inflating and deflating an inner tube inserted in the toroidal cavity, isolated from the external environment, defined by a tyre mounted on the associated rim, and for controlling the value of the pressure inside the tube, said inner tube being provided with an inflation and deflation device which does not have any element for connection to said external environment at atmospheric pressure, designed to fix the circumferential position of said tube with respect to said rim.

The aforementioned method comprises the following steps:

a) introducing pressurized air into said toroidal cavity until a predetermined pressure value is reached such as to cause contraction of the volume of the tube and a consequent elastic reaction of the materials which form said tube and are deformed by said contraction in volume;

b) waiting for the pressure inside the inner tube, as a result of said elastic reaction of the tube, to return to equilibrium with the air pressure outside said tube, in the space defined between tyre and rim;

c) discharging the pressurized air remaining in said space between tyre and rim;

d) waiting for the inner tube to have completed its expansion until it comes into contact with the rim and tyre;

e) isolating said space between tyre and rim from the external environment at atmospheric pressure.

In a first embodiment, the method makes use of a device provided with an air inlet valve of the "non-return" type and comprises the step of causing closing of said valve owing to the positive difference in pressure between the inside and outside of the inner tube, at the start of the step c).

In a second embodiment, the method makes use of a device provided with an air inlet valve of the "normally open" type and comprises the step of causing closing of said valve as a result of interference between the device and an opposition surface, in particular as a result of contact between the inner tube and the wall of the rim. This method requires that discharging of the air during the step c) should be performed very rapidly, i.e. such that the pressurized air contained inside the tube causes almost immediate expansion of said tube, resulting in closing of said valve as a result of contact with the wall of the rim before a significant quantity of air has time to escape through the aperture of the inlet valve, which is open towards the outside.

In a different embodiment, the method also makes use of a device provided with a adjustment valve of the "normally closed" type, in which an obturator keeps the valve closed as a result of an elastic-type thrusting force with a predetermined value and opens the latter under the effect of a thrusting force in the opposite direction having a value greater than the predetermined value.

In a further embodiment the method makes use of a device provided with a discharge valve of the "normally closed" type in which an obturator keeps the valve always closed until a deliberately performed action causes opening thereof.

The present invention will be understood more clearly, however, with the aid of the following description and the accompanying drawings which are intended purely by way of a non-limiting example and in which.

Figure 1:
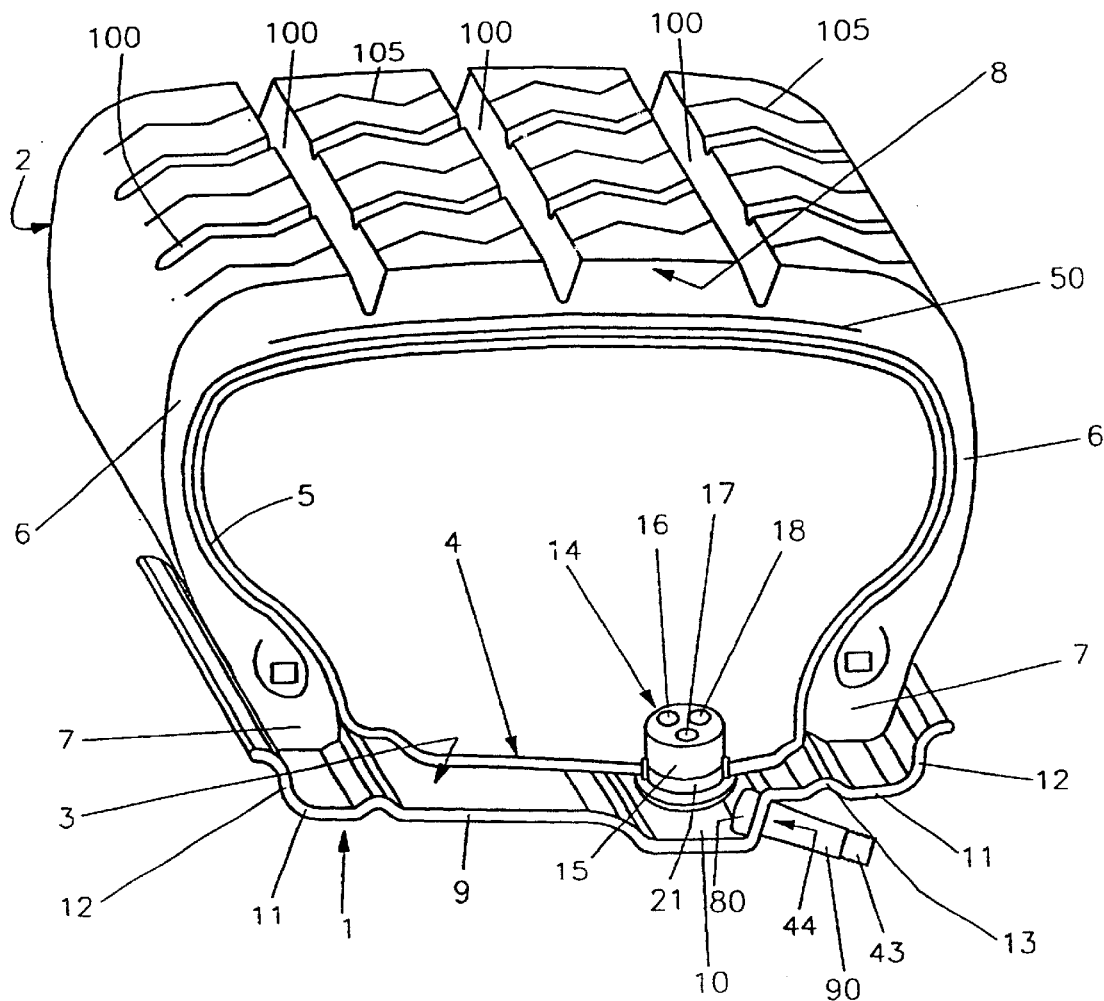
FIG. 1 is a partial axial cross-section of a tyre mounted on the respective rim and associated with the inner tube according to the invention.

FIG. 1 shows, denoted by 1, a partial cross-sectional view of a wheel for vehicles, comprising a tyre 2, a rim 3 and an inner tube 4 inserted inside the cavity delimited between tyre and rim.

The tyre 2, in the example shown, is of the conventional type and in any case of limited importance for the purposes of the invention; it comprises a toroidal carcass 5, sidewalls 6 terminating in a pair of beads 7, a tread 8 provided on its radially external surface with a suitable tread pattern including grooves 100 and cuts 105 and, if necessary, a belt structure 50 arranged, at the top of the tyre, between carcass and tread and usually comprising a plurality of belt strips arranged radially on top of one another and reinforced with textile or metal cords which are arranged parallel to one another in each strip and intersecting with respect to the adjacent strips and preferably arranged parallel to the equatorial plane in the radially outermost strip.

The rim 3 comprises a bottom surface 9 provided with a central channel 10 and two bead seats 11 which are lateral with respect to the channel and on which the beads of the tyre rest in abutment; each seat is delimited axially between an end radial surface (projecting shoulder) 12 in an axially external position and an axially internal, annular, raised surface 13.

The wall of the channel 10 advantageously has, formed in it, a hole 44 inside which an ordinary inflation valve 90 for tubeless tyres is mounted.

The tyre illustrated in FIG. 1 is of the "low profile" type, i.e. with a cross-sectional ratio H/C (between height H and width C of its cross-section) not greater than 0.7. The inner tube 4 is preferably moulded and vulcanized in a toroidal shape so as to "memorize" this shape; in other words, when it is subjected to mechanical stresses which deform it, it is able to produce elastic reactions which allow it to regain its original, non-deformed, shape. In particular, and more preferably, the inner tube is moulded and vulcanized with a toroidal shape having an internal volume not less than one third of the final operating volume.

In this connection it is particularly advantageous to use a tube (FIG. 2) which is divided up into two circumferential compartments A and B separated by a central wall 110 which has a greater rigidity than the sidewalls 115, such as that described in the European Patent Application No. 97EP-830600.9 filed by the same Applicant.

In any case, for the purposes of the invention, the inner tube may be formed in any other convenient manner and may be of any type, both single-volume and with more than two compartments, however arranged.

For the purposes of inflation and deflation of the compartments into which the inner tube is divided, preferably each compartment will be provided with its own device according to the invention.

The device 14 for inflating and deflating the inner tube has a rigid body 15, preferably made of plastic, comprising a set of valves each of which is delimited by a casing having, arranged inside it, the associated activation mechanism, i.e. the part of the valve operating between an open position and a closed position, respectively for admitting or for interrupting the flow of pressurized air through the casing.

In particular, this set of valves comprises three valves, respectively, an inflation valve 16, a adjustment valve 17 and a deflation valve 18.

The rigid body 15, which has a preferably cylindrical configuration, is mounted inside a suitable bush 21 (FIG. 2) defining a circular passing through opening formed in the elastomeric material of the radially internal surface (underside) of the inner tube.

Preferably the aforementioned rigid body (FIG. 3) has an annular portion 19 of its external surface which is threaded so as to allow it to be screwed into the bush 21, and a bottom flange 20 which allows its position to be fixed with respect to the bush.

Figure 2:
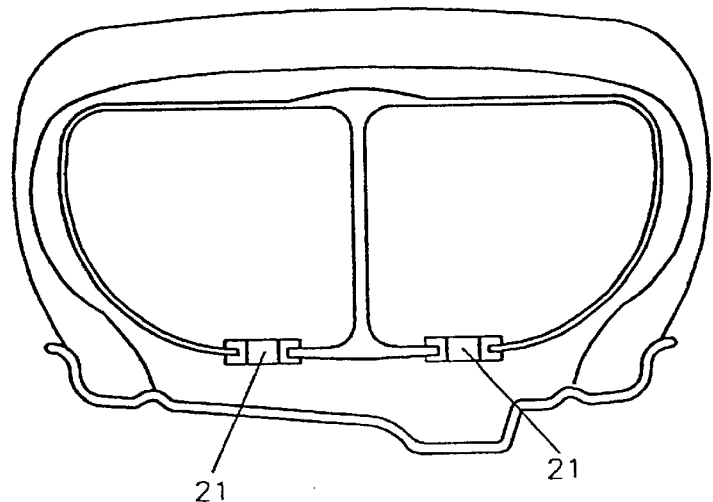
FIG. 2 illustrates a different type of inner tube according to the invention.
Figure 8:
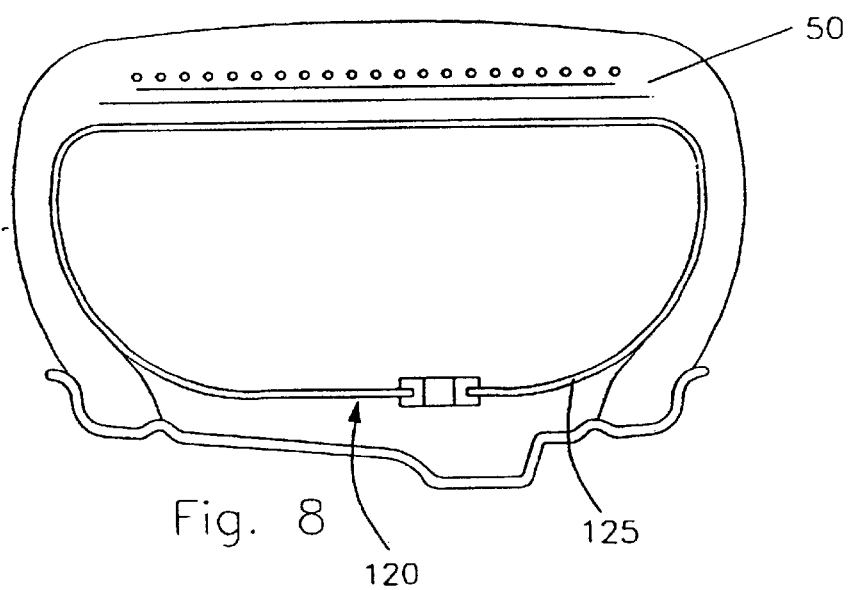
FIG. 8 shows a preferred embodiment of a tyre according to the invention.

As can be clearly seen from FIGS. 1, 2 and 8, the aforementioned rigid body 15 and the valve set contained therein is completely isolated from the surrounding environment and therefore does not have any elements for connection to the environment outside the wheel, passing through the wall of the rim. Moreover, the inner tube provided with this device is free to move in any position inside the cavity delimited by the tyre and by the wall of the rim.

Figure 3:
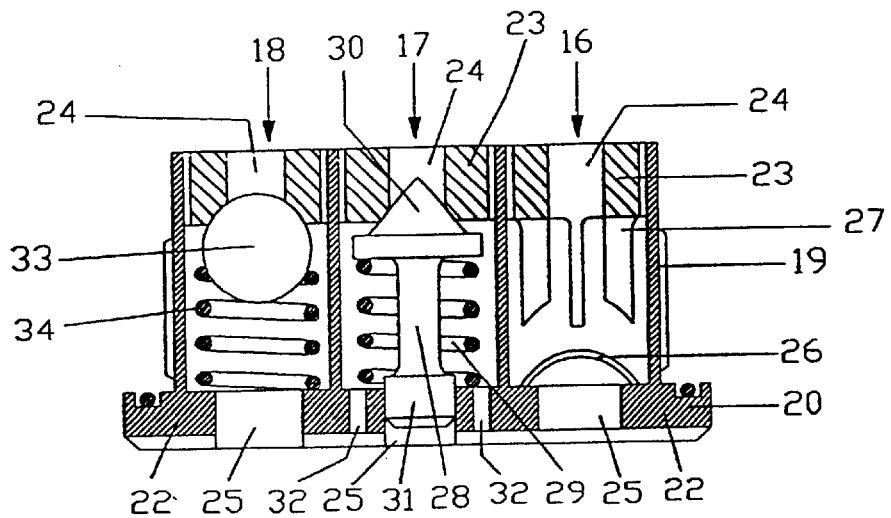
FIG. 3 illustrates a set of three valves for the inner tube according to FIG. 1.

For the sake of better comprehension and ease of description, FIG. 3 illustrates the three aforementioned valves, arranged in side by side relationship in the same plane, even though in the cylindrical body they are more advantageously arranged around the same axis of symmetry of the cylindrical body.

The three valves illustrated in FIG. 3 comprise different activation mechanisms dependent on the fact that each of them performs a single function.

Each valve has its own container casing which is substantially cylindrical in shape and delimited by two bases, respectively a first one and a second one, the first base 22 coinciding with the flange associated with the underside surface of the inner tube and the second base 23 on the axially opposite side to the flange, on the end of the casing inside the inner tube. The bases of each cylindrical casing have central holes 24, 25.

The inflation valve 16 is of the non-return type and comprises an obturator displaceable from the "valve open" position to the "valve closed" position and vice versa, the displacement between the two positions being determined by the difference in pressure existing between the axially opposite surfaces of the obturator. In the preferred embodiment of FIG. 3, the mechanism of the inflation valve comprises a lens-shaped obturator 26 which is convex towards the inside of the casing.

The obturator 26, in the "valve closed" position, rests on the first base 22 closing the hole 25 and is displaceable into the "valve open" position in a position at a distance from the first base.

The open position at a distance from the base 22 is determined by the presence of stopping elements formed by a discrete number of lamellar elements 27 projecting in cantilever from the second base 23 towards the first base 22, being circumferentially arranged at intervals from one another and axially extending over a section with a length less than the distance between said first and second bases and having their ends axially directed towards the first base profiled with a concave contour. The ends of the elements 27 form together a concave bearing surface matching the convex surface of the obturator 26.

In the open position of the valve, the flow of pressurized air coming from the hole 25 raises the lens-shaped element 26 from the base 22, passes through the free spaces between the elements 27 and from here flows through the hole 24 into the inner tube.

In the closed position the air pressure existing inside the tube presses the lens 26 against the first base 22 closing the hole 25.

Preferably, this activation mechanism of the valve is manufactured so as to have little sensitivity to forces other than those generated by the difference in pressure between the two ends of the valve, in particular to centrifugal forces which are able to act on the valve mechanism during operation of the tyre, as a result of the high speeds of the vehicle, resulting in the transition from the "valve closed" position to the "valve open" position with the risk of possible deflation of the tyre.

In a preferred embodiment, the mechanism for closing the valve, i.e. the lens-shaped element 26, is made with light materials so that its limited mass, even when combined with the effect of the square of the speed, is not able to develop a force sufficient to raise it from the closed position against the air pressure acting on its convex surface.

Even more preferably, as an alternative to or in combination with the use of light materials, the construction of an obturator which has little sensitivity to the centrifugal forces involves, for this element, a ratio between the surface area of the element in square millimetres and its mass in grammes which is greater than 40 mm$^2$/g and, even more preferably, greater than 80 mm$^2$/g.

The mechanism of the adjustment valve 17 comprises a needle 28 and a spring 29 housed inside a cylindrical container substantially identical to that of the valve 16.

More precisely, the needle 28 has on its ends respectively a conical head 30 inserted in the hole 24 of the second base 23 and a cylindrical tail-piece 31 sliding inside the hole 25 of the first base 22.

The spring 29, compressed between the axially internal annular surface of the conical head 30 and the axially internal annular surface of the first base 22, pushes the conical head 30 against the hole 24, communicating with the inner tube, keeping the valve in the closed position.

When the air pressure inside the tube exceeds by a predetermined value the external counter-pressure, the aforementioned pressure overcomes the force of the spring 29, adjusted on the basis of this predetermined value, causing the movement of the conical head 30 away from the hole 24 and the consequent flowing out of air through the gap present between the cylindrical tail-piece and the hole 25, or as an alternative to or in combination with the gap, through openings 32 formed on the first base 22.

The mechanism keeps the associated valve open until the air pressure inside the tube has dropped to a value insufficient to overcome the reaction of the spring which therefore brings the needle 28 into the closed position.

The mechanism for activating the deflation valve 18 comprises a ball 33 and a spring 34 housed inside a cylindrical container substantially identical to that of the valve 16.

The spring 34, compressed between the surface of the ball 33 and the axially internal annular surface of the first base 22, pushes the ball 33 against the hole 24, communicating with the inner tube, keeping the valve in the closed position: the thrust exerted by the spring on the ball is in fact advantageously adjusted to a value which is decidedly higher than that of the operating pressure of the tube.

By causing displacement of the ball towards the base 22, overcoming the resistance of the spring 34, the pressurized air is allowed to flow out from the inner tube through the hole 24 into the cylindrical container and from here, through the hole 25, into the cavity defined between tyre and rim, placed in communication beforehand with the external environment.

In order to cause the aforementioned displacement, according to a preferred embodiment of the invention, the obturator element, in the specific case the ball 33, is made sensitive to the effects of a field of forces generated outside the rim, preferably a magnetic field generated by a magnet arranged outside the rim. In this embodiment, therefore, the spherical obturator will have preferably at least a portion thereof consisting of soft ferromagnetic material.

The external magnetic field, generated in any known manner, is associated with the wheel in a position such as to cause attraction of the ball 33 towards the base 22, opening the valve.

It has already been mentioned that the device 14 associated with the rigid body 15, as an alternative to that illustrated in FIG. 3, may also use other embodiments of the valves and may concentrate two or more of the functions to be performed in one of the three valves mentioned.

Figure 4:
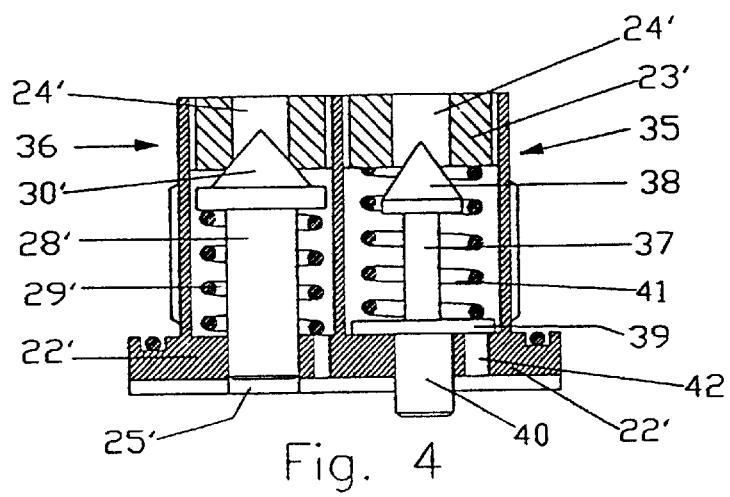
FIG. 4 illustrates a set of two valves for the inner tube according to FIG. 1.

Solely by way of example, FIG. 4 illustrates an inflation valve 35 of the "normally open" type which may be closed by means of interference with a counter-element located alongside a valve 36 intended to perform the dual function of adjustment and deflation. In the same figure the parts of the valves 35 and 36 similar to those of the valves of FIG. 3 are indicated by the same reference numbers with an apex.

In a preferred embodiment thereof, the mechanism for activation of the inflation valve 35 comprises a cylindrical stem 37 having one end provided with a conical head 38 directed towards the hole 24', and a flange 39 fixed onto the stem 37 perpendicularly with respect to the longitudinal direction thereof, at a certain distance from the end of its end portion 40, sliding in a hole of the first base 22' from which it projects axially outwards.

A spring 41 with a diameter greater than the diameter of the conical head 38, compressed between the flange 39 and the axially internal surface of the second base 23', keeps the flange 39 resting on the base 22' and, together therewith, the conical head 38 extracted from the hole 24'.

One or more holes 42 passing through the base 22' and suitable passing through openings formed on the flange 39 place in communication the inside of the valve 35 with the space delimited between rim and tyre. The inflation valve 35 is shown in the open condition. Closing of the valve is determined by entry of the conical head 38 into the hole 24', caused by displacement of the end portion 40 towards the base 23' when the external surface of the device 14, as will be seen, comes into contact with the surface of the rim. In a preferred embodiment of the adjustment valve 36, the obturator of the valve comprises a cylindrical stem 28', sliding in the hole 25' of the first base 22' and having one end provided with a conical head 30' which has a base diameter greater than the diameter of the stem and is inserted in the hole 24'.

A spring 29', compressed between the axially internal annular surface of the conical head 30' and the axially internal annular surface of the first base 22', pushes the conical head 30' against the hole 24', communicating with the inner tube, keeping the valve in the closed position.

In the aforementioned preferred embodiment the cylindrical stem 28' is made with a material sensitive to a magnetic field, thus giving rise to an activation mechanism useful both for a adjustment valve and for a deflation valve. In particular, this obturator replaces the ball 33 of the valve 18, while, as regards operation of the valve 36, respectively for the adjustment or discharging function, the same comments already made still apply. In this case, in view of the cylindrical shape of the magnetic actuator it is advantageous to use, in place of the soft ferromagnetic material suitable for spherical actuators, a hard ferromagnetic material magnetized so as to form a permanent magnet: particularly suitable are sintered materials consisting of a samarium/cobalt or iron/neodymium/boron alloy.

Figure 5:
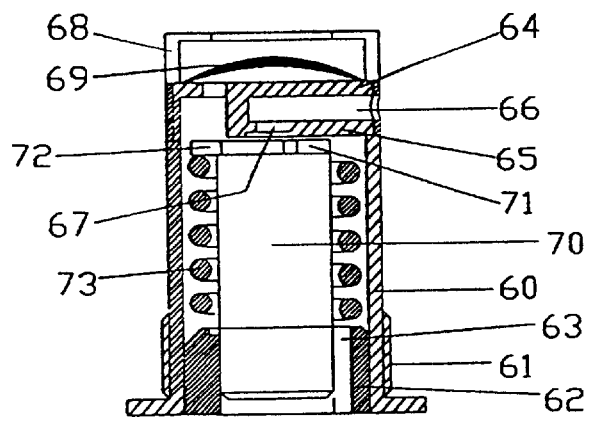
FIG. 5 illustrates a preferred embodiment for the valve set according to FIG. 1.
Figure 6:
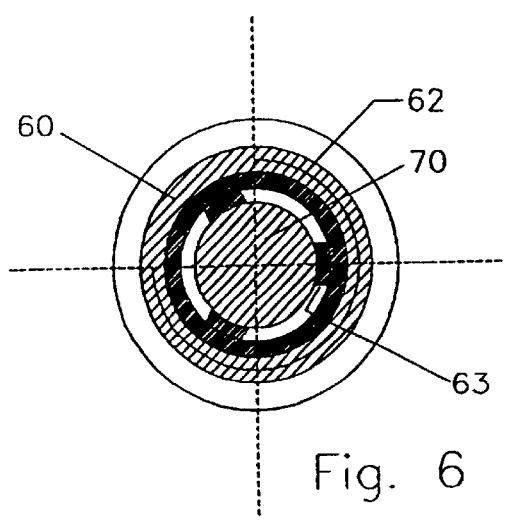
FIG. 6 illustrates a first constructional detail of the valve set in the embodiment according to FIG. 5, along the plane VI—VI of said figure.
Figure 7:
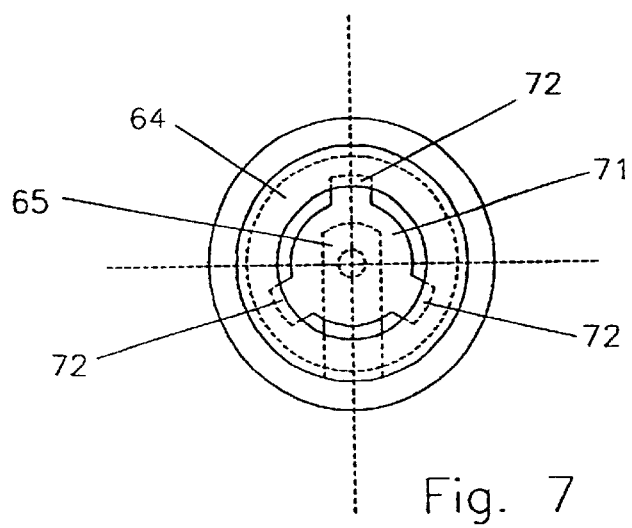
FIG. 7 illustrates another constructional detail of the valve set in the embodiment according to FIG. 5, along the plane VII—VII of said figure.

In the most preferred embodiment of the invention, a single valve performs all three functions envisaged. This valve (FIG. 5) preferably comprises a cylindrical casing 60 which is flanged on the end projecting outside the inner tube and provided with an external threading 61 or other equivalent fastening system (rapid coupling, etc.) in the vicinity of said flanged end for mounting inside the bush 21 already described.

A ring 62 is mounted inside said flanged end, by means of screwing or in another convenient manner, said ring being provided with at least two, but preferably three or more shoulders 63 projecting radially inwards.

The axially opposite end of the cylindrical casing 60 is closed by a circular rim 64 integral with a duct 65 which is soldered onto the axially internal surface of said rim, has two openings, respectively 66 on the side surface of the cylindrical casing and 67 on the side surface of the duct, and is directed towards the flanged end of the casing and preferably coaxial therewith.

A cup-shaped cage 68 is screwed, or else locked, in a coaxial position, onto the circular rim 64, and a lens-shaped element 69, with its concavity directed towards the cylindrical casing is movable inside the cup and rests on the circular rim.

A coaxial stem 70 is arranged inside the cylindrical body 60, said stem being axially slidable and in particular guided between the shoulders 63 of the ring 62: the axial surface of the stem directed towards the circular rim is integral with a disc 71, which preferably has a diameter greater than that of the stem 70 and even more preferably is provided with lugs 72 radially projecting in cantilever fashion from the periphery of the disc. The aforementioned stem 70 is preferably a permanent magnet which is made of a sintered alloy chosen preferably from among the types mentioned above, or in any case comprises ferromagnetic material.

Finally, a compressed spring 73 surrounds the stem 70, resting against the ring 62 at one end and against the projecting edge of the disc 71 and/or against the lugs 72, at the other end.

As already mentioned for the similar valves described above, the thrust value of the spring is calibrated on the basis of the value of the working pressure of the tyre and hence the inner tube.

In the light of the above description, the operating mode of the valve may be easily understood.

During the inflating stage, pressurized air acting outside the tube flows inside the cylindrical body, passing between the side surface of the stem 70 and the ring 62, and from here, passing by the disc 71 and is through the circular rim 64, displaces the lenticular element 69 from its rest position on the rim and enters into the tube, passing through the cage 68 which has the exclusive function of containing the lenticular element in a predetermined space.

As soon as the pressure acting inside the tube exceeds the value of the external pressure, the lenticular element is pressed against the circular rim, closing the central hole thereof, so as to prevent air passing from inside to outside the tube.

If the value of said internal pressure exceeds the adjustment value of the spring, the pressurized air which is present inside the duct, communicating with the tube through the hole 66, compresses the spring, displacing the disc 71 and the associated stem 70 away from the duct, thus allowing the air to flow out through the hole 67 towards the flanged end of the cylindrical body and from here into the external environment.

As soon as the internal pressure, decreasing in value, has become less than the adjustment value of the spring, the latter will extend, bringing back immediately the disc 71 against the duct 65 so as to close the hole 67.

Should one then wish to perform rapid deflation of the tube it is sufficient to apply a magnetic field which acts on the stem 70, drawing it towards the flanged end of the cylindrical body, so as to displace the disc 71 and open the hole 67, as already described.

The magnetic field will keep the pin in the open position of the hole for the whole period required by the operator.

At this point of the description the person skilled in the art is able to design and produce other types of valves which do not have elements for connection to the external environment, in accordance with the invention, and which are designed to perform at least the three functions described here.

For example, the simple magnetic actuator of the deflation valve could be replaced with an active device, for example comprising a miniaturized solenoid valve, and a radio wave or ultrasound receiver designed to activate the solenoid valve upon receiving a suitable coded signal.

The solenoid valve could be of the electromagnetic type or could comprise phase-changing actuators, fuse-type diaphragms, elements made of shape-memorizing material, electric micromotors, piezoelectric actuators and other similar devices.

In an alternative embodiment, the wheel of the invention comprises a new type of tyre which can be fitted to a conventional rim, so as to form said wheel. Preferably, in the tyre according to the invention, the inner tube forms an integral part, i.e. a single body with the tyre: this may be preferably achieved by introducing an unprocessed, or at least partially prevulcanized, inner tube into the unprocessed carcass of the tyre to be vulcanized. During the moulding and vulcanization process, the tube, inflated with pressurized fluid in accordance with the usual vulcanization processes not described here since they are known to the person skilled in the art and not particularly important for the purposes of the present invention, adheres intimately to the surface of the tyre except in its circumferential underside portion 120 (FIG. 8) axially extending between the beads.

By way of conclusion, the tyre according to the invention is characterized by the presence of a circumferential baffle 125 which connects together the beads and separates the toroidal cavity delimited by the carcass of the tyre from the external environment. This baffle need not necessarily form part of an inner tube inserted in the tyre, but may be made as an independent semi-finished product, for example a sheet of elastomeric material, formed separately, for example by means of calendering, and assembled with the tyre during a stage in the manufacture thereof.

The device according to the invention described above is advantageously mounted in the wall of said baffle. Alternatively, the tyre provided with said baffle may also comprise one or more independent cavities, each provided with its own device according to the invention.

The tyre wheel according to FIG. 1, independently of whether it has a tyre and an inner tube separate from one another or a tyre provided with the separator baffle described above, comprises means for introducing and extracting pressurized air respectively into and from the toroidal cavity defined between tyre and rim. In all the embodiments, these means do not have an extension of any kind which is connected to the tube or to the baffle and which is designed to fix the circumferential position of the tube or the tyre with respect to the rim.

In the preferred embodiment of the wheel according to the invention, said means for introducing and extracting air comprise the usual valve for inflation of tubeless tyres essentially consisting of a tubular element 43 having one end incorporated in a rubber stopper 80 inserted in an air-tight manner inside a corresponding hole 44 in the wall of the rim and provided on the opposite end with a suitable closing cap, not shown.

The procedure for mounting and inflating the tyre 2 on the rim 3 initially involves the step of fitting a first bead 7 onto the rim until it is in the vicinity of the associated bead seat.

Then, the inner tube is introduced into the not yet closed space, delimited between tyre and rim, then the second bead is fitted onto the rim into the associated bead seat.

The cap of the tubular element 43 is now removed and, using any instrument, for example a common compressed-air supply gun with a pressure gauge, pressurized air is introduced inside the space between tyre and rim. The pressure value of the air which is introduced is chosen sufficiently high so as to be able to push almost instantaneously the two beads 7 of the tyre onto their bead seats, against the corresponding projecting shoulders 12 of the rim, thus producing in this way the sealed closure of the internal cavity between the tyre and rim. As soon as the desired pressure value has been reached, easily ascertainable with any known device (pressure gauge), introduction of the pressurized air is stopped.

Preferably the air pressure value is chosen so as to be between 150% and 200% of the working pressure; in the example of the description, the pressure of the air introduced is 4.5 bar for a tyre intended to have an air pressure of 2.5 bar in working conditions.

The high-pressure air deforms initially the inner tube, compressing it substantially onto itself; however the tube, having been advantageously moulded with a torus shape, memorizes this shape and reacts to deformation by developing internal tensions which result in it reassuming its toroidal configuration.

In these conditions, a negative pressure is produced inside the tube, with respect to the external pressure of the cavity, resulting in an air flow directed towards the inside of the inner tube through the inflation valve of the device according to the invention.

As the internal volume of the tube is filled with pressurized air, the tube expands, returning gradually to its moulded shape; finally, after a certain amount of time, the pressure equilibrium between the inside of the tube and the external cavity between tyre and rim is reached. During this stage, both the adjustment valve and the deflation valve remain closed.

The air supply tool is now removed from the tubular element 43 so that all the pressurized air contained in the cavity is discharged through it, resulting in this cavity assuming the value of atmospheric pressure.

The difference in pressure between the two compartments completes expansion of the inner tube 4, also in a practically instantaneous manner, so as to arrange it with the underside surface pressed in abutment against the bottom surface of the rim and, in the case of the valve 35, causes the sealed closure of the inflation valve owing to the effect of the thrust exerted by the wall of the rim on the base 40 of the stem 37.

In fact, owing to this difference in pressure, the underside surface of the inner tube is pressed against the bottom surface of the rim, forcing the end portion 40 of the stem 37 to enter into the hole 25, overcoming the opposite thrust of the spring 41, thus forcing the conical head 38 to enter into the hole 24, closing off communication between the inside and the outside of the inner tube.

In the case of the valve 16 or the valve 60, closing is performed as a result of the positive difference in pressure applied to the two opposite ends of the obturator element.

Since the pressure reached inside the inner tube is greater than the predetermined working pressure, the adjustment valve opens since this pressure produces, on the obturator element, a thrust having a value greater than that exerted by the adjustment spring.

The valve is closed when the difference between the pressure inside and the pressure outside the tube, equivalent to atmospheric pressure since the cap of the valve 43 has been removed, corresponds to the working pressure on the basis of which adjustment of the opposition spring has been performed.

The behaviour of a tyre provided with a separator baffle according to the invention will be functionally entirely identical to that with the inner tube, except for the different manner and different degree of deformation of the baffle.

Once the operation involving inflation of the tube and adjustment of the pressure to the predetermined value has been completed, the closing cap is applied onto the tubular element 43, isolating the cavity of the wheel from the external environment.

The value of the pressure existing inside the inner tube may be determined at any moment using, for example, the already mentioned supply tool of the known type.

The procedure involves injecting a small quantity of pressurized air into the cavity of the wheel; the value indicated by the pressure gauge, which corresponds with a reasonable degree of accuracy to the pressure existing inside the tube, is then read off.

Alternatively, a less experienced operator may advantageously use, in order to verify the value of the inflation pressure, a suitable instrument which is able to meter exactly the quantity of air introduced into the aforementioned cavity, outside the tube.

Let us assume, for example, that 100 cm³ of air at a pressure of 5 bar has been injected and the resultant pressure measured. Let us assume also that the internal volume of the expanded tube is equivalent to 30 litres; the measurement error arising from introduction of the aforementioned quantity of air is equivalent to 0.0143 bar, corresponding to 0.6%, and may be ignored since it is less than the adjustment error of pressure gauges normally used for checking the pressure of tyres.

If the pressure inside the tube must be increased, for example in order to restore the value of the working pressure, the inflation procedure described above must be repeated from the beginning.

Rapid deflation of the inner tube, as already seen, may be performed by causing displacement of the obturator of the corresponding valve from its closed position. This displacement may be performed in many ways, from which the person skilled in the art will not have difficulty in choosing the one most suited to his specific requirements; these ways include the possibility of opening up apertures formed on the wall of the rim and mechanically gripping with a suitable tool the abovementioned closing obturator which is accessible from outside the device in all of the embodiments thereof illustrated above: the Applicant, however, prefers to make use of a permanent magnet or an electromagnet brought into the vicinity of the deflation valve provided with an obturator sensitive to the magnetic field.

The magnetic field resulting from the magnet, attracting the aforementioned obturator towards the base of the rim, overcomes the force of the opposition spring so as to cause opening of the valve and consequently flowing out of the pressurized air, present inside the inner tube, to the outside through the tubular element 43 from which the cap has been removed beforehand.

The inflation and deflation device according to the invention has numerous advantages compared to the valves associated with an inner tube according to the state of the art.

In fact the main characteristic feature of this device is that it comprises, in any embodiment, valves which do not have elements providing a connection between the internal volume of the inner tube and the environment outside the wheel.

Therefore, in travel conditions where slipping of the tyre occurs with respect to the rim, causing rotation also of the tube around the rim, the inflation valve always remains intact and perfectly functional without undergoing any damage, differently from that which occurred in traditional inner tubes with tearing of the tube wall and even shearing of the valve stem passing through the rim wall.

Moreover, normal working of the inner tube is advantageously ensured owing to the fact that the device also performs, with valves separate from one another or with means concentrated in the same valve, the additional functions of adjustment and deflation; in particular the adjustment function is no longer performed manually by an operator, but is performed by an automatic device which ensures precisely predetermined values of the working pressure which are always the same for each tube inflation operation, while accidental deflation due to damage of the part of conventional valves which projects from the rim, for example as a result of impacts with obstacles in the road or other problems, such as loss of the closing cap, is eliminated.

In fact, from examining FIG. 1 the inner tube and the set of valves associated therewith remain independent and intact even in the case where the tubular element 43 inserted in the rim is damaged during. travel for any reason.

In fact, even if this element were extracted completely from the hole 44 on the rim, it would not alter and in any case could not influence the activation mechanism of the valves, whatever the function of the latter. Moreover the inflation device according to the invention, which does not have parts associated with the inner tube and projecting from the rim, allows the inner tube to be arranged rapidly and without twisting inside the cavity between tyre and rim.

This is because the present embodiment of the inflation valve, which is characterized by the abovementioned characteristic feature, eliminates the need to carry out complex and difficult operations which are required with conventional valves according to the state of the art in order to insert the valve stem of the inner tube, from inside the cavity between tyre and rim towards the outside through the appropriate hole provided on the rim.

Advantageously, the greater ease of inserting the inner tube into the aforementioned cavity not only results in a substantial saving in time and greater appeal of the product to maintenance and repair personnel, but may also give rise to preferential use of an inner tube with several compartments in tyres manufactured as the tubeless version.

The inner tube with at least two independent compartments forms in fact a safety device designed to give the tyre stability even when partially deflated following perforation of one compartment.

It must be pointed out that the inflation device according to the invention, which has valves without elements projecting outside the rim, overcomes the drawbacks listed above both when the inner tube consists of a single compartment and when it has several independent compartments manufactured in any manner.

Preferably, in this case each compartment will be provided with its own device as described and illustrated above.

Advantageously, owing to the characteristic features of the invention, rapid and easy extraction of the inner tube from the wheel is also obtained when it is required to perform replacement of the tyre or the tube or its inflation device, which is mounted in the tube wall in a manner easily separable from the latter.

The preferred arrangement of the valves in a single rigid body 15 or 60 allows moreover immediate extraction thereof from the housing bushes 21 (FIG. 2) and immediate overhaul or replacement thereof.

What is claimed is:

1. A device for inflating and deflating a flexible container which is elastically expandable for introduction of pressurized fluid into an internal volume of the container,
   the device being inserted into a wall of the container,
   wherein the device together with the container are housed inside a cavity that is isolable from a surrounding environment, and
   wherein the device has no elements that connect the internal volume of the container with the surrounding environment,
   further comprising at least one inlet valve for inflating the container with pressurized fluid,
   wherein the at least one inlet valve is a valve of a non-return type comprising an activation mechanism actuated by a difference in pressure existing between ends of the at least one inlet valve, and
   wherein the activation mechanism comprises an obturator element which is displaceable from an open position to a closed position of the at least one inlet valve as a result of a difference in pressure existing between an inside and an outside of the container.

2. The device of claim 1, further comprising at least one adjusting valve for maintaining a pressure existing in the container within a predetermined range of values.

3. The device of claim 1, further comprising at least one discharging valve for rapid deflation of the container.

4. The device of claim 1, further comprising a rigid body incorporating an inlet valve, an adjusting valve, and a discharging valve.

5. The device of claim 1, wherein the at least one inlet valve is a valve of a normally-open type comprising an activation mechanism displaceable from an open position to a closed position of the at least one inlet valve as a result of interference with an opposition element.

6. The device of claim 2, wherein the at least one adjusting valve is a valve of a normally-closed type comprising an activation mechanism which is displaceable from a closed position to an open position of the at least one adjusting valve as a result of a thrust exerted by a pressurized fluid inside the container against a resilient opposition element exerting an opposite thrust having a predetermined value.

7. The device of claim 3, wherein the at least one discharging valve is a valve of a normally-closed type comprising an activation mechanism displaceable from a closed position to an open position of the at least one discharging valve as a result of a thrust exerted by an action arising from the surrounding environment against a resilient opposition element exerting an opposite thrust having a value greater than that of a pressure of a fluid inside the container.

8. A device for inflating and deflating an inner tube for a tyre, the inner tube being elastically expandable for introduction of pressurized fluid into an internal volume of the inner tube,
   the device being inserted in a wall of the inner tube, the inner tube and the device being housed in a toroidal cavity defined by a tyre mounted on a respective mounting rim,
   wherein the cavity is isolable from a surrounding environment at atmospheric pressure, wherein the pressurized fluid can flow from the surrounding environment into the cavity and from the cavity out to the surrounding environment, and wherein the device does not have elements for connecting the internal volume of the inner tube and the surrounding environment outside the cavity,
   further comprising at least one inlet valve for inflating the inner tube with pressurized fluid, comprising an activation mechanism displaceable from an open position to a closed position of the at least one inlet valve as a result of a difference in pressure existing between ends of the at least one inlet valve,
   wherein the activation mechanism is not sensitive to centripetal or centrifugal forces occurring during use of the tyre,
   wherein the activation mechanism comprises a lenticular-obturator element which is convex towards an internal volume of the inner tube, and
   wherein a ratio between a surface area and a weight of the lenticular-obturator element is greater than 40 $mm^2/g$.

9. The device of claim 8, further comprising at least one adjusting valve for maintaining a pressure existing inside the inner tube within a predetermined range of values and at least one discharging valve for rapid deflation of the inner tube.

10. The device of claim 9, wherein a single activation mechanism forms two or more of the at least one inlet valve, the at least one adjusting valve, and the at least one discharging valve.

11. A device for inflating and deflating a flexible container, wherein the flexible container includes at least one internal volume and is located in a cavity, wherein a pressurized fluid can flow from a surrounding environment into the cavity and from the cavity out to the surrounding environment, and wherein the cavity is isolable from the surrounding environment, comprising:
   at least one inflation valve flow-connected between the cavity and the at least one internal volume; and
   at least one deflation valve flow-connected between the cavity and the at least one internal volume;
   wherein the device does not directly flow-connect the at least one internal volume of the flexible container with the surrounding environment,
   wherein the at least one inflation valve is a non-return-type valve having respective ends and comprising a mechanism actuated by a pressure difference existing between the respective ends,
   wherein the mechanism comprises at least one obturator element, and
   wherein the at least one obturator element is displaceable from an open position of the at least one inflation valve to a closed position of the at least one inflation valve as a result of a pressure difference between the cavity and the at least one internal volume.

12. The device of claim 11, wherein the at least one inflation valve is a normally-open-type valve comprising a mechanism displaceable from an open position of the at least one inflation valve to a closed position of the at least one inflation valve as a result of interaction with an opposition element.

13. The device of claim 11, further comprising at least one adjustment valve flow-connected between the cavity and the at least one internal volume, wherein the at least one adjustment valve maintains a pressure in the at least one internal volume within a predetermined range of values.

14. The device of claim 13, wherein the at least one adjustment valve is a normally-closed-type valve comprising a mechanism including a resilient opposition element, and wherein the mechanism is displaceable from a closed position of the at least one adjustment valve to an open position of the at least one adjustment valve as a result of a first force exerted by a pressurized fluid in the at least one internal volume against an opposing force having a predetermined value exerted by the resilient opposition element.

15. The device of claim 11, wherein the at least one deflation valve is a normally-closed-type valve comprising a mechanism including a resilient opposition element, and wherein the mechanism is displaceable from a closed position of the at least one deflation valve to an open position of the at least one deflation valve as a result of a first force exerted from the surrounding environment against an opposing force having a predetermined value exerted by the resilient opposition element.

16. The device of claim 11, further comprising at least one adjustment valve flow-connected between the cavity and the at least one internal volume, wherein the device comprises a single body including the at least one inflation valve, the at least one deflation valve, and the at least one adjustment valve.

17. The device of claim 11, further comprising at least one adjustment valve flow-connected between the cavity and the at least one internal volume, wherein the device comprises a rigid body including the at least one inflation valve, the at least one deflation valve, and the at least one adjustment valve.

18. A device for inflating and deflating an inner tube, wherein the inner tube includes at least one internal volume and is located in a toroidal cavity defined between a tyre and a rim on which the tyre is mounted, wherein a pressurized fluid can flow from a surrounding environment into the toroidal cavity and from the toroidal cavity out to the surrounding environment, and wherein the toroidal cavity is isolable from the surrounding environment, comprising:

at least one inflation valve flow-connected between the toroidal cavity and the at least one internal volume; and at least one deflation valve flow-connected between the toroidal cavity and the at least one internal volume;

wherein the device does not directly flow-connect the at least one internal volume of the inner tube with the surrounding environment, wherein the at least one inflation valve comprises respective ends and a mechanism displaceable from an open position of the at least one inflation valve to a closed position of the at least one inflation valve as a result of a pressure difference between the respective ends, wherein the mechanism is not sensitive to centripetal or centrifugal forces occurring during use of the tyre, wherein the mechanism comprises at least one lenticular-obturator element which is convex towards the at least one internal volume of the inner tube, and wherein a ratio between a surface area and a weight of the at least one lenticular-obturator element is greater than 40 mm$^2$/g.

19. The device of claim 18, further comprising at least one adjustment valve flow-connected between the cavity and the at least one internal volume, wherein the at least one adjustment valve maintains a pressure in the at least one internal volume within a predetermined range of values.

* * * * *